US009547673B1

(12) United States Patent
Britton et al.

(10) Patent No.: US 9,547,673 B1
(45) Date of Patent: Jan. 17, 2017

(54) METHODS AND APPARATUS FOR ENTERPRISE APPLICATION INTEGRATION

(71) Applicant: OBJECTSTORE, INC., Austin, TX (US)

(72) Inventors: Colin P. Britton, Lexington, MA (US); Amir Azmi, Billerica, MA (US); Ashok Kumar, Marlborogh, MA (US); Noah W. Kaufman, Cambridge, MA (US); Chandra Bajpai, Natick, MA (US); Robert F. Angelo, Sudbury, MA (US)

(73) Assignee: ObjectStore, Inc., Austin, TX (US)

( * ) Notice: Subject to any disclaimer, the term of this patent is extended or adjusted under 35 U.S.C. 154(b) by 0 days.

(21) Appl. No.: 13/693,519

(22) Filed: Dec. 4, 2012

Related U.S. Application Data

(63) Continuation of application No. 11/430,258, filed on May 8, 2006, now Pat. No. 8,335,792, which is a continuation of application No. 09/917,264, filed on Jul. 27, 2001, now Pat. No. 7,058,637.

(60) Provisional application No. 60/291,185, filed on May 15, 2001.

(51) Int. Cl.
*G06F 17/30* (2006.01)
*G06F 17/00* (2006.01)

(52) U.S. Cl.
CPC ....... *G06F 17/303* (2013.01); *G06F 17/30893* (2013.01); *G06F 17/3056* (2013.01); *G06F 17/30536* (2013.01)

(58) Field of Classification Search
CPC .............. G06F 17/30979; G06F 17/30893; G06F 17/30551; G06F 17/30536; G06F 17/30424; G06F 17/3056
USPC ................... 707/781, 999.001, 700
See application file for complete search history.

(56) References Cited

U.S. PATENT DOCUMENTS

| | | | | |
|---|---|---|---|---|
| 5,740,231 | A * | 4/1998 | Cohn et al. | 379/88.22 |
| 5,794,009 | A * | 8/1998 | Coleman et al. | 710/15 |
| 5,884,325 | A * | 3/1999 | Bauer et al. | |
| 5,970,490 | A * | 10/1999 | Morgenstern | |
| 6,418,448 | B1 * | 7/2002 | Sarkar | |
| 7,346,635 | B2 * | 3/2008 | Whitten | G06F 17/303 |
| 2002/0178170 | A1 * | 11/2002 | Britton | G06F 17/30893 |

(Continued)

OTHER PUBLICATIONS

Restriction Requirement dated Aug. 6, 2007, mailed in U.S. Appl. No. 11/430,258, pp. 1-6.

(Continued)

*Primary Examiner* — Jean M Corrielus

(57) ABSTRACT

A method for enterprise application integration that uses "connectors" that can be instantiated via downloading (e.g., using Java® or other such technologies) to provide interfaces to respective disparate database systems. The databases systems may comprise any variety of now or heretofore known systems, e.g. SAP, Oracle, and so forth. The connectors can, for example, translate between a native language (or API) of the respective database systems and an internal language/protocol of the enterprise application integration system. To this end, the connectors can utilize a scripting language to access the respective database systems. Data retrieved from the database systems can be stored in a central data store in the form of RDF triplets, from which directed graphs can be generated for to generate presentations consolidated from the multiple database systems.

11 Claims, 8 Drawing Sheets

(56) References Cited

U.S. PATENT DOCUMENTS

2003/0055826 A1* 3/2003 Graham .............. G06F 17/3056

OTHER PUBLICATIONS

Response to Restriction Requirement dated Aug. 6, 2007, as filed on Sep. 6, 2007, in U.S. Appl. No. 11/430,258, pp. 1-4.
Non-Final Office Action dated Sep. 20, 2007, mailed in U.S. Appl. No. 11/430,258, pp. 1-12.
Response to Non-Final Office Action dated Sep. 20, 2007, as filed in U.S. Appl. No. 11/430,258 on Feb. 20, 2008, pp. 1-9.
Final Office Action dated Mar. 26, 2008, mailed in U.S. Appl. No. 11/430,258, pp. 1-118.
Request for Continued Examination (RCE) and RCE Submission as filed in U.S. Appl. No. 11/430,258 on Jul. 28, 2008, pp. 1-19.
Non-Final Office Action dated Oct. 21, 2008, mailed in U.S. Appl. No. 11/430,258, pp. 1-178.
Response to Non-Final Office Action dated Oct. 21, 2008, as filed in U.S. Appl. No. 11/430,258 on Mar. 21, 2009, pp. 1-14.
Notice of Non-Compliant Amendment dated Apr. 22, 2009, mailed in U.S. Appl. No. 11/430,258, pp. 1-2.
Response to Notice of Non-Compliant Amendment dated Apr. 22, 2009, as filed in U.S. Appl. No. 11/430,258 on May 22, 2009, pp. 1-7.
Final Office Action dated Aug. 7, 2009, mailed in U.S. Appl. No. 11/430,258, pp. 1-32.
Request for Continued Examination (RCE) and RCE Submission as filed in U.S. Appl. No. 11/430,258, pp. 1-19.
Notice of Non-Compliant Amendment dated Dec. 9, 2011, mailed in U.S. Appl. No. 11/430,258, pp. 1-3.
Response to Notice of Non-Compliant Amendment dated Dec. 9, 2011, as filed in U.S. Appl. No. 11/430,258 on Jan. 9, 2012, pp. 1-9.
Notice of Non-Compliant Amendment dated Feb. 10, 2012, mailed in U.S. Appl. No. 11/430,258, pp. 1-3.
Response to Notice of Non-Compliant Amendment dated Feb. 10, 2012, as filed in U.S. Appl. No. 11/430,258, on Mar. 8, 2012, pp. 1-7.
Notice of Allowance dated Aug. 16, 2012, mailed in U.S. Appl. No. 11/430,258, pp. 1-22.
Notice of Allowance mailed Aug. 29, 2005, in U.S. Appl. No. 09/917,264, pp. 1-11.
Response to Non-Final Office Action dated Apr. 7, 2005, as filed in U.S. Appl. No. 09/917,264 on Aug. 8, 2005, pp. 1-5.
Non-Final Office Action dated Apr. 7, 2005, mailed in U.S. Appl. No. 09/917,264, pp. 1-33.
Appeal Brief as filed in U.S. Appl. No. 09/917,264 on Nov. 22, 2004, pp. 1-17.
Advisory Action dated Sep. 30, 2004, mailed in U.S. Appl. No. 09/917,264, pp. 1-2.
Response to Final Office Action dated Apr. 19, 2004, as filed in U.S. Appl. No. 09/917,264 on Aug. 19, 2004, pp. 1-13.
Final Office Action dated Apr. 19, 2004, mailed in U.S. Appl. No. 09/917,264, pp. 1-17.
Response to Non-Final Office Action dated Jun. 18, 2003, as filed in U.S. Appl. No. 09/917,264, pp. 1-10.
Non-Final Office Action dated Jun. 18, 2003, mailed in U.S. Appl. No. 09/917,264, pp. 1-22.

* cited by examiner

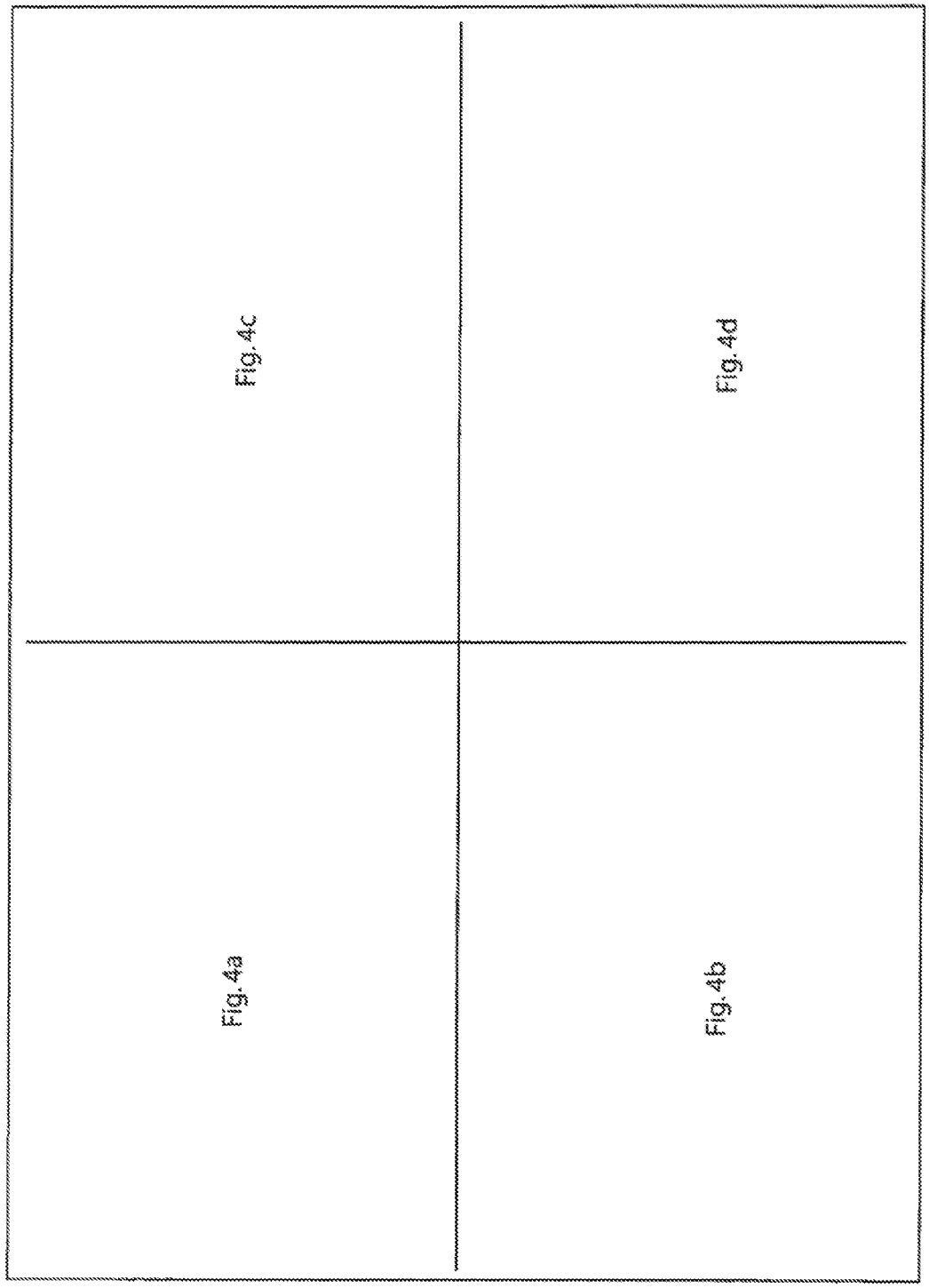

METHODS AND APPARATUS FOR ENTERPRISE APPLICATION INTEGRATION

This application is a continuation of U.S. application Ser. No. 11/430,258, filed May 8, 2006, now U.S. Pat. No. 8,335,392, which is a continuation of U.S. application Ser. No. 09/917,264, now U.S. Pat. No. 7,058,637, which claims the benefit of priority to U.S. provisional patent application No. 60/291,185, filed on May 15, 2001, entitled "Methods and Apparatus for Enterprise Application Integration." All of these applications are incorporated herein by reference in their entireties.

BACKGROUND OF THE INVENTION

The invention pertains to digital data processing and, more particularly, to methods and apparatus for enterprise application integration. It has application in the dynamic consolidation of disparate databases, e.g., of marketing, e-commerce or other transactional data, over a network, such as the Internet.

It is not uncommon for a single company to have several database systems—separate systems not interfaced—to track internal and external planning and transaction data. Such systems might of been developed at different times throughout the history of the company and are therefore of differing generations of computer technology. For example, a marketing database system tracking customers may be ten years old, while an enterprise resource planning (ERP) system tracking inventory might be two or three years old. Integration between these systems is difficult at best, consuming specialized programming skill and constant maintenance expenses.

A major impediment to enterprise application integration (EAI) is the consolidation of these disparate legacy databases with one another and with newer e-commerce databases. For instance, inventory on-hand data gleaned from a legacy ERP system may be difficult to combine with customer order data gleaned from web servers that support e-commerce (and other web-based) transactions. This is not to mention difficulties, for example, in consolidating resource scheduling data from the ERP system with the forecasting data from the marketing database system.

An object of this invention is to provide improved methods and apparatus for digital data processing and, more particularly, for enterprise application integration.

A further object of the invention is to provide such methods and apparatus as can be readily and inexpensively integrated with legacy, current and future database management systems.

A still further object of the invention is to provide such methods and apparatus as can be implemented incrementally or otherwise without interruption of enterprise operation.

Yet a still further object of the invention is to provide such methods and apparatus as to 10 facilitate ready access to up-to-date enterprise data, regardless of its underlying source.

Yet still a further object of the invention is to provide such methods and apparatus as permit flexible presentation of enterprise data in an easily understood manner.

SUMMARY OF THE INVENTION

The aforementioned are among the objects attained by the invention, one aspect of which provides a method for enterprise application integration that uses software ("connectors") that can be instantiated via downloading (e.g., using Java® or other such technologies) to provide interfaces to respective disparate database systems. The databases systems may comprise any variety of now or heretofore known systems, e.g. SAP, Oracle, and so forth.

The connectors can, for example, translate between a native language (or API) of the respective database systems and an internal language/protocol of the enterprise application integration system. To this end, the connectors can utilize a scripting language to access the respective database systems.

Another aspect of the invention provides methods as described above that store data accessed from the database systems in a central data store, referred to below as a "holographic" data store. That data can be stored, for example, as resource definition framework (RDF) triplets.

The connectors, according to further aspects of the invention, can query the respective database systems based on requests received from the holographic data store and/or from a framework server, a user or otherwise. In related aspects, the data store is periodically updated via application of queries to the database systems.

Further aspects of the invention provide methods as described above in which a graph generator generates directed graphs from the RDF triplets in the holographic store. The graphs can be "walked" in order to discern answers to queries for information reflected by triplets originating from data in one or more of the databases.

Another aspect of the invention provides methods as described above in which a framework server accepts queries, e.g., from a user, and formats them for application to the holographic data store.

Further aspects of the invention provide enterprise application integration systems that operate in accord with the foregoing.

These and other aspects of the invention are evident in the drawings and in the description that follows.

BRIEF DESCRIPTION OF THE DRAWINGS

The foregoing features of this invention, as well as the invention itself, may be more fully understood from the following detailed description of the drawings in which:

FIG. 4 depicts a directed graph representing data triplets of the type maintained in a data store according to the invention.

DETAILED DESCRIPTION OF THE ILLUSTRATED EMBODIMENT

Figure 1:
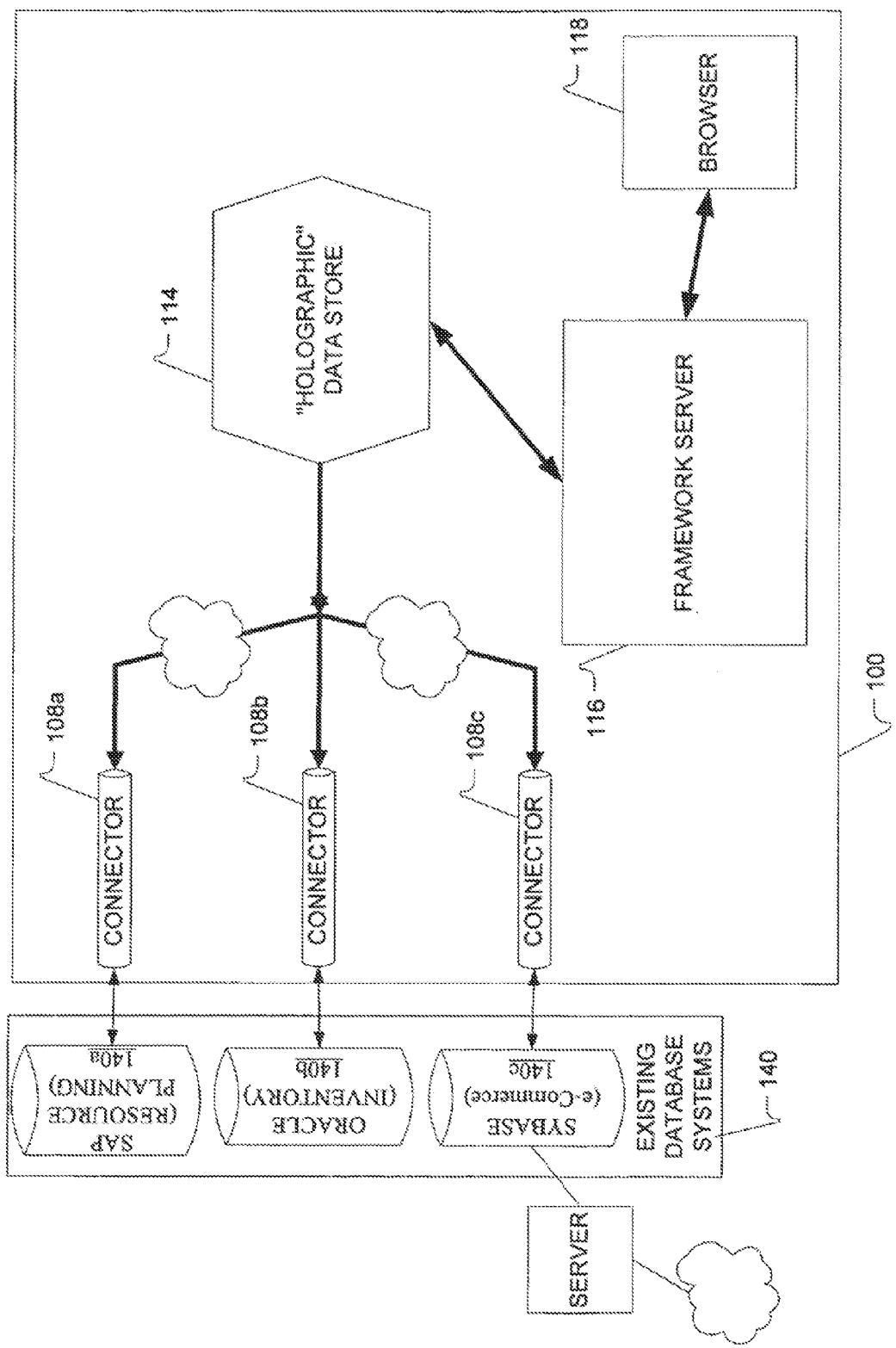
FIG. 1 depicts an improved enterprise application integration system according invention.

FIG. 1 depicts a enterprise application integration system according to the invention. The illustrated system 100 includes connectors 108 that provide software interfaces to legacy, e-commerce and other databases 140 (hereinafter, collectively, "legacy databases"). A "holographic" database 114 (hereinafter, "data store" or "holographic data store"), which is coupled to the legacy databases 140 via the connectors 108, stores data from those databases 140. A framework server 116 accesses the data store 114, presenting selected data to (and permitting queries from) a user browser 118. The server 116 can also permit updates to data in 10 the data store 114 and, thereby, in the legacy databases 140.

Legacy databases 140 represent existing (and future) databases and other sources of information in a company, organization or other entity (hereinafter "enterprise"). In the illustration, these include a retail e-commerce database (e.g., as indicated by the cloud and server icons adjacent database 140c) maintained with a Sybase® database management system, an inventory database maintained with an Oracle® database management system and an ERP database maintained with an SAP® database management system. Of course, these are merely examples of the variety of databases or other sources of information with which methods and apparatus as described herein can be used. Common features of illustrated databases 140 are that they maintain information of interest to an enterprise and that they can be accessed via respective software applications program interfaces (API) or other mechanisms known in the art.

Connectors 108 serve as an interface to legacy database systems 140. Each connector applies requests to, and receives information from, a respective legacy database, using that database's API or other interface mechanism. Thus, for example, connector 108a applies requests to legacy database 140a using the corresponding SAP API; connector 108b, to legacy database 140b using Oracle API; and connector 108c, to legacy database 140c using the corresponding Sybase API.

In the illustrated embodiment, these requests are for purposes of accessing data stored in the respective databases 140. The requests typically originate in the holographic data store 114 or the framework server 116, wherefrom they are routed to the connectors via the store 114. Alternatively or in addition, the requests can originate, in the first instance, from the connectors 108 themselves, e.g., by way of preprogramming or otherwise. Regardless of their origin, the requests can be stored in the connectors 108 for application and/or reapplication to the respective legacy databases 108.

Data and other information (collectively, "messages") generated by the databases 140 in response to the requests are routed by connectors to the holographic data store 114. Those messages can be cached by the connectors 108, though, they are preferably immediately routed to the store 114.

The software connectors 108 may reside on any digital data processing system(s) that is (are) in communications coupling—e.g., via a dial-up connection, bus, cable, network and/or Internet (as indicated by cloud icons), or otherwise—with the respective legacy databases 140 and with the holographic data store 114. Typically, the connectors reside on computers within the firewall (or other security barrier) of the enterprise, though, they may reside elsewhere (e.g., local to the holographic store 114 and/or the framework server 116).

In a preferred embodiment, the connectors are implemented as Java® servlets, or the like, though they can be implemented in any programming language. Indeed, the connectors fabricated as special purpose hardware devices, though, such hardware lacks one of the immediate advantages of Java (or other software) implementations—to wit, the ability to download and/or remotely implement, upgrade and maintain it.

In embodiments, such as that illustrated here, wherein the connectors 108 are implemented as Java® servlets, or the like, those connectors preferably execute with a suitable environment, e.g., utilizing Java virtual machines running scripted Extensible Markup Language ("XML") operating according Extensible Stylesheet Language Transformation ("XSLT") scripts. A suitable environment for accomplishing this is Tomcat running under Cocoon 2, both available as from Apache Software Foundation or in the alternative, WebSphere available from IBM Corporation. As such, the use of XSLT scripts allow the connector to communicate with a variety of database systems by merely downloading the XSLT using any computer readable medium, e.g. disk, electronic download, or CD-ROM.

Figure 2:
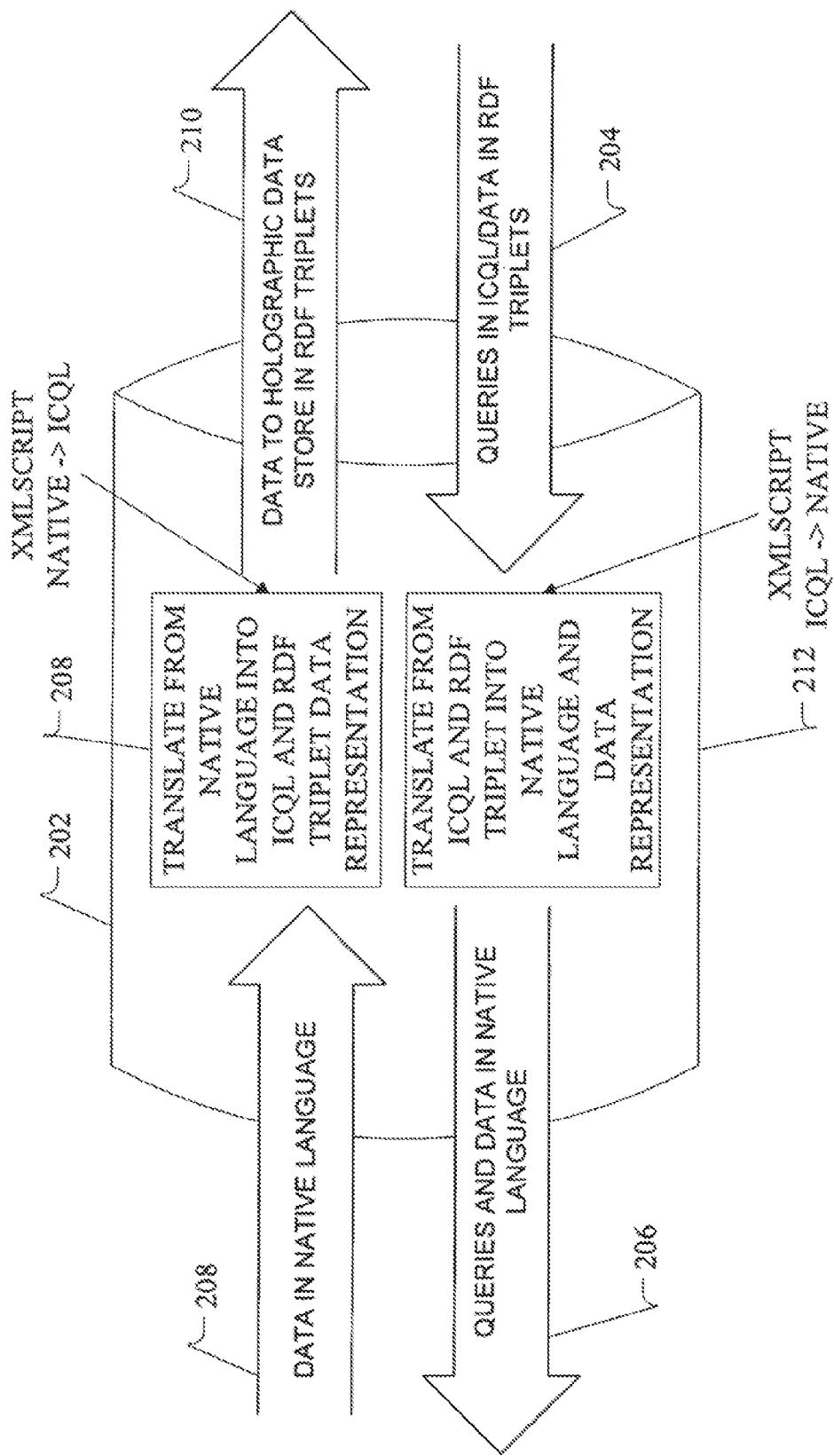
FIG. 2 depicts operation of a software interface "connector" according to the invention.

Referring to FIG. 2, the connectors translate between the API (or other interface mechanisms) of the legacy databases 140 and a language/protocol common to the connectors 108, the holographic data store 114 and the framework server 116. In the illustrated embodiment, that common language/protocol is referred to Intelligent Connector Query Language (ICQL), though, it will be appreciated that other embodiments may use other languages/protocols and, indeed, may not utilize a common language/protocol at all. Thus, for example, requests generated by holographic data store 114 and routed to connector 108a in ICQL (or other language/protocol) are converted (or translated or transformed) by that connector into an appropriate API call to legacy database 140a. Likewise, messages generated by that database 140a in response to such a request are converted by the connector 108a back into ICQL (or other language/protocol).

Figure 3:
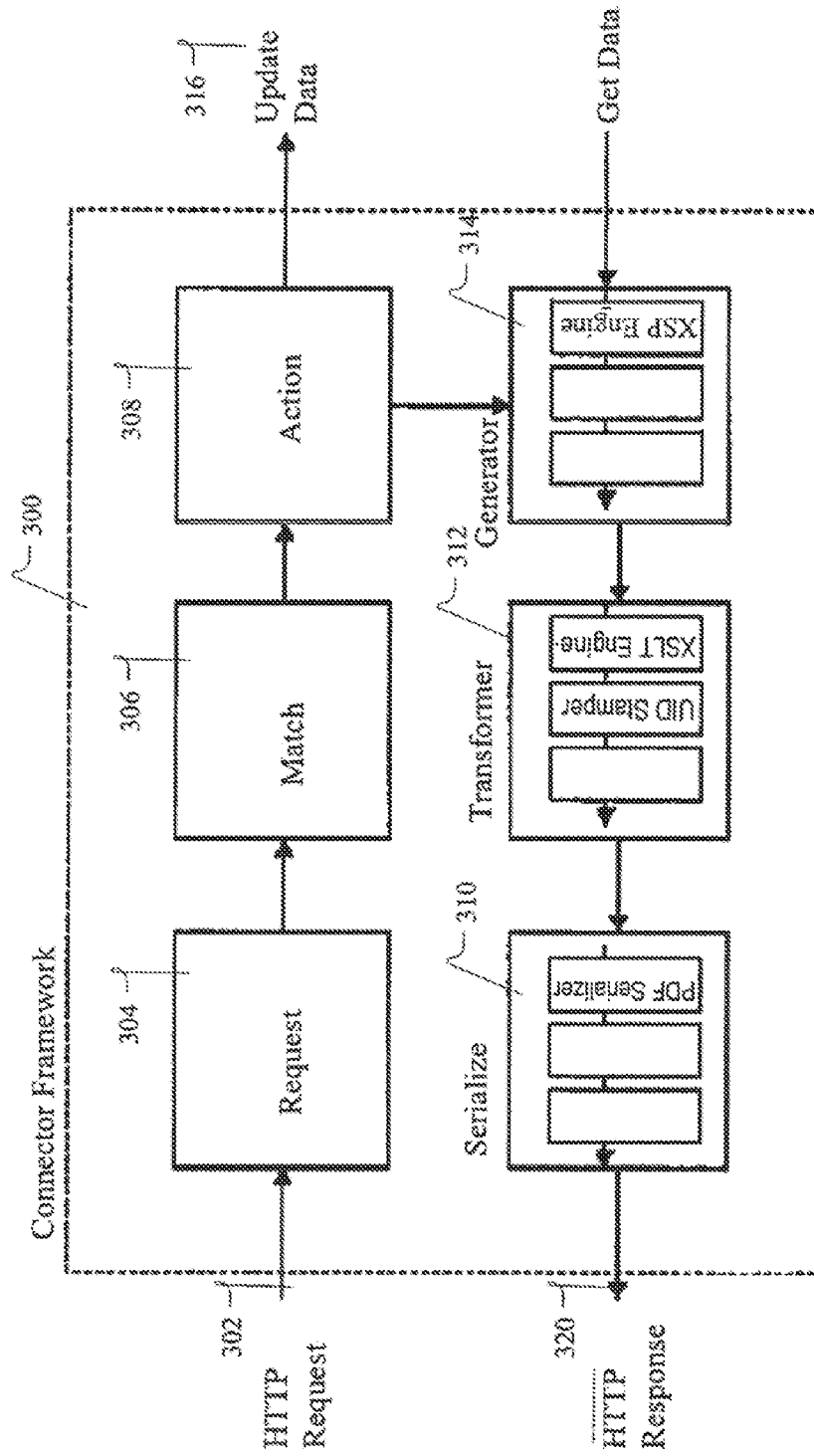
FIG. 3 depicts data flow within a connector according to the invention.
Figure 4A:
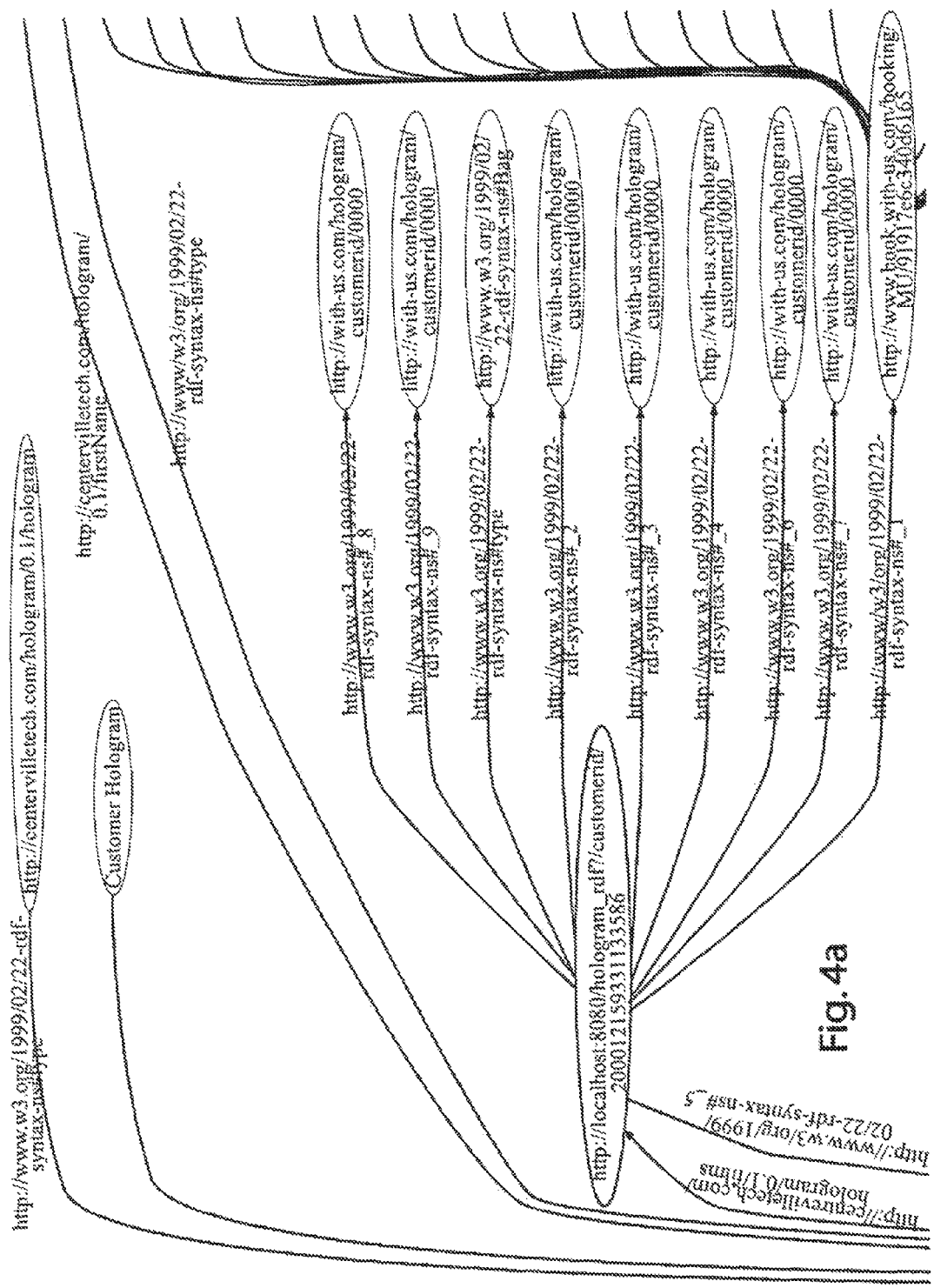
FIG. 4 is divided into FIGS. 4a, 4b, 4c, and 4d (collectively referred to as "FIG. 4")
Figure 4B:
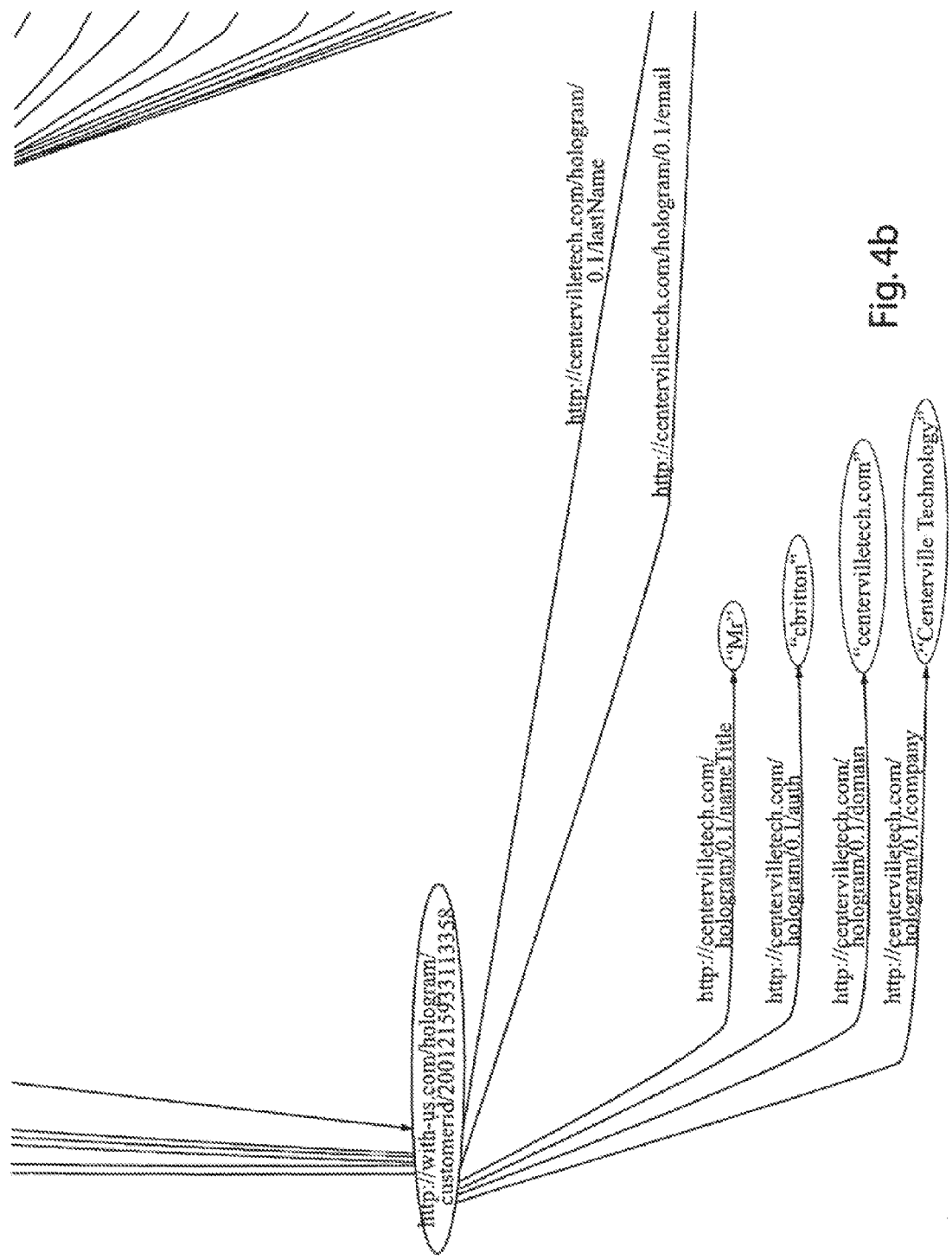
Figure 4C:
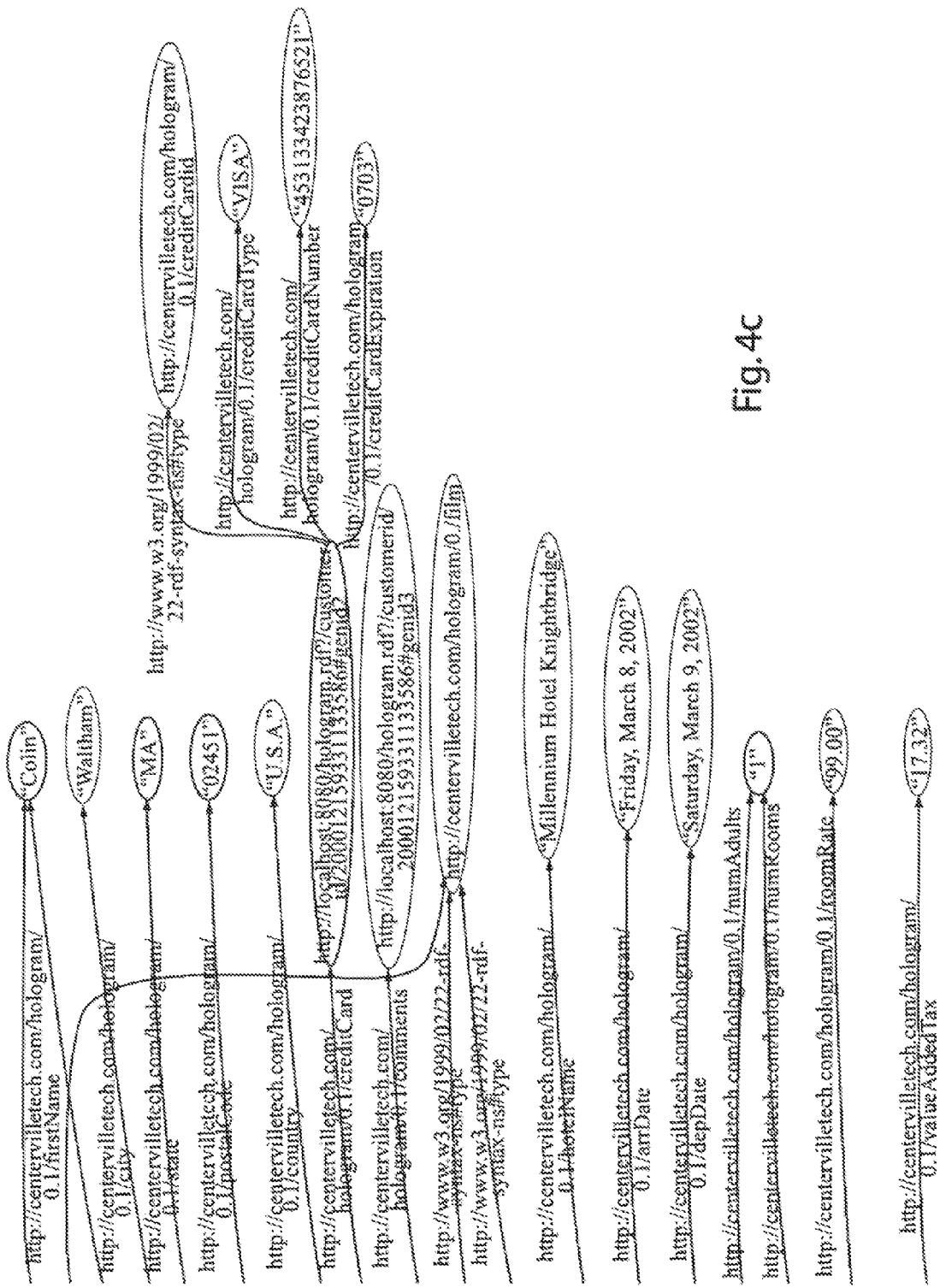
Figure 4D:
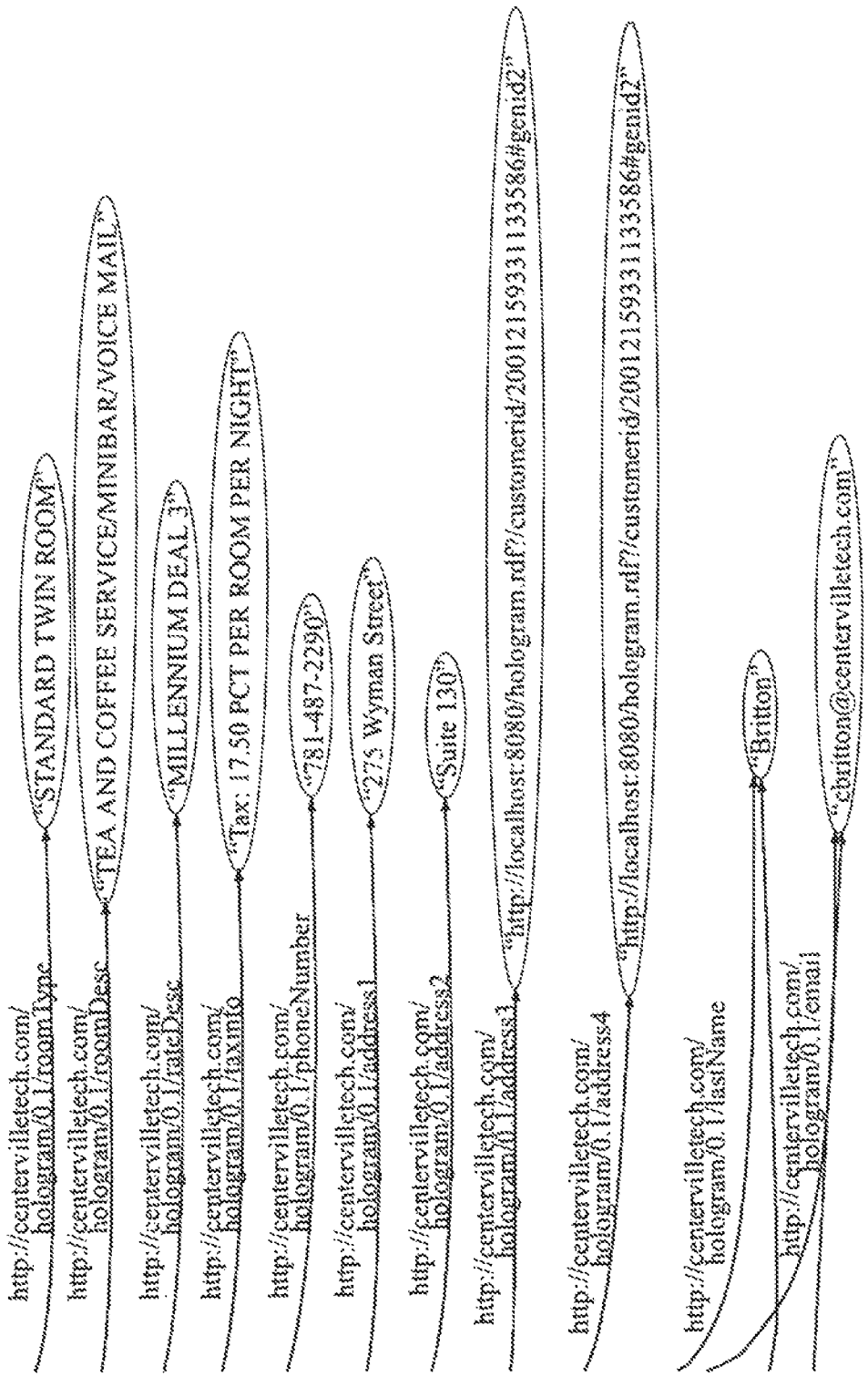

A more complete understanding of the operation of the connectors 108 may be attained by reference to FIG. 3, which shows data flow within a connector 300 according to one embodiment of the invention.

Illustrated is a connector 300 utilizing Hypertext Transfer Protocol ("HTTP") as a vehicle to transfer messages (e.g., requests and responses thereto) with holographic data store 114, such as the one illustrated in FIG. 1. Each message 302 (e.g., request) originating from the data store 115 is processed by request, match and action modules 304-308, as shown. The message is sent to the connected legacy database, e.g., 140a, using the appropriate API or other interface mechanism. It will be apparent to those of ordinary skill in the art that the actual transformation sequence is dependent on the type of legacy database system being accessed and the method of communication between the holographic data store and the connector framework.

Messages received by the connector 300 from the legacy database are likewise processed for return to the holographic data store 114. In the illustrated example, a message 318 is received and routed to a generator module 314 which performs a transformation according to a XSP script, and then routes the message to a transformer module 312. The transformer module 302 transforms the data field contained within the message into RDF triplet form suitable for the holographic data store 114 to catalog, and assigns a unique Universal Identification Number ("UID") for later conversion into a Universal Resource Locator ("URL") by the data store 114. Finally, the message is routed to a serializer module 310 and transformed for HTTP transfer to the holographic data store 320.

Through use a connector framework comprised of selectable modules, the connectors may be electronically downloaded or otherwise remotely updated as required. Moreover, multiple engines/modules can be inserted in the internal data pipeline of connector 300. Each such module transforms the data and passes it along the stream.

Referring back to FIG. 1, the holographic data store 114 stores data from the legacy databases 140 and from the framework server 116 as RDF triplets. The data store 114 can be embodied on any digital data processing system or systems that are in communications coupling (e.g., as defined above) with the connectors 108 and the framework server 116 capable of supporting Java® running XML/XSLT as defined above. Typically, the data store 114 is embodied in a workstation or other high-end computing device with high capacity storage devices or arrays, though, this may not be required for any given implementation.

Though the holographic data store 114 may be contained on an optical storage device, this is not the sense in which the term "holographic" is used. Rather, it refers to its storage of data from multiple sources (e.g., the legacy databases 140) in a form which permits that data to be queried and coalesced from a variety of perspectives, depending on the needs of the user and the capabilities of the framework server 116. To this end, a preferred data store 114 stores the data from the legacy databases 140 in object-predicate-subject form, e.g., RDF triplets, though those of ordinary skill in the art will appreciate that other forms may be used as well, or instead.

Referring to FIG. 4, the data store can store—by way of non-limiting example—RDF triplets representing data from marketing and/or e-commerce "legacy" databases. The figure particularly illustrates triplets representing hotel reservation transactions. Each triplet comprises a predicate 402, subject 406 and object 408 such that the object 408 is "linked" to its subject(s) 406 via predicate(s) 402.

In the illustrated example, each predicate 402 is assigned a Uniform Resource Indicator ("URI") 410 such that related data is located via URI's in a hierarchical ordering, represented for example by the directed arrow 402. If the triplet is high-level 408 its URI 404 points to a lower set of triplets 412, each of which has a URI 414 that may point to data or to further triplets 416.

Each subject 406 contains transactional information pertaining to an enterprise resource item, e.g. credit card type, type of product bought or date. For example, as illustrated in FIG. 4, a typical subject 420 shows a value of "data of departure" related to a hotel booking transaction. It can be appreciated from one in the art that many different types of data may be contained within the subject, e.g. literal values, referenced values or additional URI's.

An object 408 contains information pertaining to the "who" of the transaction, such as the person or enterprise initiating the transaction. The object, similar to the subject, may be a literal, e.g. "Smith", or a unique identifier such as a locator address 422 such that each related predicate and subject can be referenced through the object.

It can be appreciated that any given transaction (or other event that gives rise to triplets of the type stored in the data store 114) may be reflected in multiple legacy database systems 140. When those systems are queried by the connectors, this may result in multiple triplets causing redundant or related information to be stored within the holographic store 114. The illustrated data store 114 includes a relationalizer that periodically passes through the retained triplets to combine these related triplets into "bags," at the same time removing any redundancies as determined by a calculated confidence level or other similar technique. This can be performed by comparing sequential levels of objects and merging triplets and bags of similar objects. For example, two people at the same address and same last name may be merged into a "family" bag, and so on. In this way, data storage is both minimized and related such that queries can be executed using the minimal execution time. The data store 114 can also remove redundant information from the legacy databases 140 in a similar manner dependent on the capabilities of the specific database.

The data store 114 includes a graph generator (not shown) that uses the stored triplets to generate directed graphs in response to queries (e.g., in ICQL form) from the framework server 116. These may be queries for information reflected by triplets originating from data in one or more of the legacy databases 140 (one example might be a request for the residence cities of hotel guests who booked reservations on account over Independence Day weekend, as reflected by data from an e-Commerce database and an Accounts Receivable database). Such generation of directed graphs from triplets can be accomplished in any conventional manner known the art (e.g., as appropriate to RDF triples or other manner in which the information is stored). Directed graphs generated by the data store are passed back to the server 116 for presentation to the user.

In the event that the data store 114 does not include sufficient information (e.g., triplets) necessary to respond to a query from the framework server 116, it can pass the query directly to the connectors 108 for application to the legacy databases 140. Alternatively or in addition, the data store 114 can construct further queries necessary to "fill out" the triplet store with legacy database information necessary to respond to the query.

In a preferred embodiment, illustrated data store 114 polls the legacy database systems 140 (via connectors 108) to obtain current information at pre-determined intervals, times or otherwise. This can be accomplished using the queries stored within the data store 114 or the connectors 108 themselves.

Referring back to FIG. 1, the framework server 116 generates requests to the data store 114 (and/or indirectly to the legacy databases via connectors 108, as discussed above) and presents information therefrom to the user via browser 118. The requests can be based on ICQL requests entered directly by the user though, preferably, they are generated by the server 116 based on user selections/responses to questions, dialog boxes or other user-input controls. In a preferred embodiment, the framework server includes one or more user interface modules, plugins, or the like, each for generating queries of a particular nature. One such module, for example, generates queries pertaining to marketing information, another such module generates queries pertaining to financial information, and so forth.

In addition to generating queries, the framework server (and/or the aforementioned modules) "walks" directed graphs generated by the data store 114 to present to the user (via browser 118) any specific items of requested information. Such walking of the directed graphs can be accomplished via any conventional technique known in the art. Presentation of questions, dialog boxes or other user-input controls to the user and, likewise, presentation of responses thereto based on the directed graph can be accomplished via conventional server/browser or other user interface technology.

In some embodiments, the framework server 116 permits a user to update data stored in the data store 114 and, thereby, that stored in the legacy databases 140. To this end, changes made to data displayed by the browser 118 are transmitted by server 116 to data store 114. There, any triplets implicated by the change are updated and forwarded to the respective legacy databases 140, which utilize the corresponding API (or other interface mechanisms) to update their respective stores.

In some embodiments, the server 116 can present to the user not only data from the data store 114, but also data gleaned by the server directly from other sources. Thus, for example, the server 116 can directly query an enterprise website for statistics regarding web page usage, or otherwise.

A further understanding of the operation of the framework server 116 and of the illustrated embodiment may be attained by reference to the appendix filed herewith.

Described herein are methods and apparatus meeting the above-mentioned objects. It will be appreciated that the illustrated embodiment is merely an example of the invention and that other embodiments, incorporating changes to those described herein, fall within the scope of the invention. What we claim is:

The invention claimed is:

1. A method for enterprise application integration comprising:
   executing code to program a computer system into a machine for:
      downloading code that is executable by the computer system for effecting information transfers between a first database and a second database;
      executing the downloaded code with the computer system to program the computer system for:
         transferring information between the first database and the second database, and transferring information between the first database and the second database comprises at least one of:
            receiving a request for information stored in the first database using a first protocol and transmitting the request for information received from the first database to the second database using a second protocol; and
            receiving a request for information stored in the second database using the second protocol and transmitting the request for information received from the second database to the first database using the first protocol.

2. The method according to claim 1, wherein transferring information between the first database and the second database further comprises:
   executing queries against that database from which information is received.

3. The method of claim 1 wherein transferring information between the first database and the second database comprises:
   executing the downloaded code to translate between an application program interface (API-1DB) of the first database to the second protocol to receive the information from the first database and to transmit the information to the second database; and
   executing the downloaded code to translate between an application program interface (API-2DB) of the second database to the first protocol to receive the information from the second database and to transmit the information to the first database.

4. The method of claim 1 wherein receiving a request for information stored in the first database using a first protocol and transmitting the information received from the first database to the second database using a second protocol comprises:
   receiving and transmitting resource definition format triplets ("RDF triplets"), respectively.

5. The method of claim 4 wherein receiving a request for information stored in the first database using a first protocol and transmitting the information received from the first database to the second database using a second protocol comprises:
   receiving and transmitting an RDF triplet whose subject comprises any of a literal value, reference value, and uniform identification number ("URI").

6. The method of claim 5 wherein receiving a request for information stored in the first database using a first protocol and transmitting the information received from the first database to the second database using a second protocol comprises:
   receiving and transmitting an RDF triplet whose subject reflects transactional information.

7. The method of claim 6 wherein receiving a request for information stored in the first database using a first protocol and transmitting the information received from the first database to the second database using a second protocol comprises:
   receiving and transmitting an RDF triplet whose predicate comprises a URI, such that related data being transferred between the first and second databases is represented by URIs in a hierarchical ordering.

8. The method of claim 6 wherein receiving a request for information stored in the first database using a first protocol and transmitting the information received from the first database to the second database using a second protocol comprises:
   receiving and transmitting an RDF triplet through whose object each related predicate and subject can be referenced.

9. The method of claim 6 wherein receiving a request for information stored in the first database using a first protocol and transmitting the information received from the first database to the second database using a second protocol comprises:
   receiving and transmitting an RDF triplet whose object is any of a literal or an identifier.

10. The method of claim 6 wherein receiving a request for information stored in the first database using a first protocol and transmitting the information received from the first database to the second database using a second protocol comprises:
    receiving and transmitting an RDF triplet representing any of marketing information or an e-commerce or other transaction.

11. The method of claim 1 wherein transferring information between the first database and the second database further comprises:
    applying a first query to the first database using an application program interface ("API-DB1") to the second database;
    receiving a request for information stored in the first database using the API-DB1 in response to the applied first query;
    applying a second query to the second database using an application program interface ("API-DB2") to the second database; and
    receiving a request for information stored in the second database using the API-DB2 in response to the applied second query.

* * * * *